United States Patent
Altay

(10) Patent No.: US 9,380,648 B2
(45) Date of Patent: Jun. 28, 2016

(54) HEATING SYSTEM FOR AN AIRCRAFT OR SPACECRAFT

(71) Applicant: Airbus Operations GmbH, Hamburg (DE)

(72) Inventor: Mehmet Altay, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 9 days.

(21) Appl. No.: 14/362,250

(22) PCT Filed: Nov. 27, 2012

(86) PCT No.: PCT/EP2012/073719
§ 371 (c)(1),
(2) Date: Jun. 2, 2014

(87) PCT Pub. No.: WO2013/083436
PCT Pub. Date: Jun. 13, 2013

(65) Prior Publication Data
US 2014/0319115 A1  Oct. 30, 2014

Related U.S. Application Data

(60) Provisional application No. 61/567,743, filed on Dec. 7, 2011.

(30) Foreign Application Priority Data

Dec. 7, 2011 (DE) .......... 10 2011 087 871

(51) Int. Cl.
*B60L 1/02* (2006.01)
*H05B 1/02* (2006.01)
(Continued)

(52) U.S. Cl.
CPC ............ *H05B 1/0236* (2013.01); *B64C 1/1453* (2013.01); *B64C 1/18* (2013.01);
(Continued)

(58) Field of Classification Search
CPC ........ H05B 1/0236; H05B 3/548; B64C 1/18; B64C 1/1453; B64D 13/08; B64D 15/12; B64D 2221/00; B64G 1/50; B64G 1/428; H04B 2203/5458; H04B 2203/547; H04B 2203/5483; H04B 2203/5491; H04B 2203/5425; H04B 2203/5437; H04B 2203/5445; H04B 2203/545; H04B 2203/5441; B23K 9/124; B23K 9/1087; B23K 9/095; H04L 1/1867; H04L 27/18
See application file for complete search history.

(56) References Cited

U.S. PATENT DOCUMENTS 5,089,974 A * 2/1992 Demeyer et al. ............. 340/3.41
5,655,732 A   8/1997 Frank
(Continued)

FOREIGN PATENT DOCUMENTS

GB   2410481   *  8/2005
GB   2433483      6/2007
WO   2007107731   9/2007

OTHER PUBLICATIONS

Low-Cost—Sensorik an Hochtemperatur-Aktoren ueber Power Line Communication, Freiburg.
(Continued)

*Primary Examiner* — Shawntina Fuqua
(74) *Attorney, Agent, or Firm* — Greer, Burns & Crain, Ltd.

(57) ABSTRACT

A heating system for an aircraft or spacecraft with a control device which includes at least one power line data transmission transceiver and one sensor controller, and at least one remote component which has a sensor element and a heating element, the at least one power line data transmission transceiver being connected to the at least one remote component via a connecting cable, the control device being designed to supply the at least one heating element with power via the connecting cable and the sensor controller being designed to exchange first control signals with the sensor element via the connecting cable.

13 Claims, 1 Drawing Sheet

(51) Int. Cl.
  *B64C 1/18*  (2006.01)
  *B64D 13/08* (2006.01)
  *B64D 15/12* (2006.01)
  *B64C 1/14*  (2006.01)
  *H04B 3/54*  (2006.01)
  *B64G 1/42*  (2006.01)
  *B64G 1/50*  (2006.01)

(52) U.S. Cl.
  CPC ............... *B64D 13/08* (2013.01); *B64D 15/12* (2013.01); *B64G 1/428* (2013.01); *B64G 1/50* (2013.01); *H04B 3/548* (2013.01); *B64D 2221/00* (2013.01); *H04B 2203/5458* (2013.01)

(56) References Cited

U.S. PATENT DOCUMENTS

| | | |
|---|---|---|
| 7,580,777 B2 | 8/2009 | Smith et al. |
| 2002/0168184 A1 | 11/2002 | Meisiek |
| 2007/0112480 A1 | 5/2007 | Smith et al. |
| 2007/0158501 A1 | 7/2007 | Shearer et al. |
| 2008/0302910 A1 | 12/2008 | Calamvokis |

OTHER PUBLICATIONS

German Office Action, Nov. 23, 2012.
International Search Report, Mar. 8, 2013.

\* cited by examiner

HEATING SYSTEM FOR AN AIRCRAFT OR SPACECRAFT

CROSS-REFERENCES TO RELATED APPLICATIONS

This application claims benefit of and priority to the German patent application No. 10 2011 087 871.8, filed Dec. 7, 2011, the U.S. Provisional Application No. 61/567,743, filed Dec. 7, 2011, and the International Patent Application No. PCT/EP2012/073719, filed Nov. 27, 2012, the entire disclosures of which are incorporated herein by way of reference.

BACKGROUND OF THE INVENTION

The present invention relates to a heating system for an aircraft or spacecraft and a method for operating a heating system for an aircraft or spacecraft.

Heating elements in an aircraft are usually controlled by so-called Ice Protection Control Units (IPCUs). In this process, each heating element is assigned to one or more temperature sensors which provide temperature measurement data for the area surrounding the heating elements, this data in turn being used to control and adjust the heating elements.

The heating elements and the temperature sensors are controlled by the IPCUs as remote components and their control signals are transmitted via corresponding control cables.

For example, Document U.S. Pat. No. 7,580,777 B2 discloses a heating system for an aircraft which comprises a plurality of local control devices to control heating components and temperature sensors and also a central heating controller.

The document by A. Kiefer and L. M. Reindl entitled: Low-Cost-Sensorik an Hochtemperatur-Aktoren über Power-Line Communication, Sensoren and Messsysteme (Low-cost sensors on high-temperature actuators via power line communication, Sensors and Measurement Systems) P. 127-129, 13th ITG/GMA Conference, 13-14 Mar. 2006 in Freiburg/Breisgau, discloses a measurement system for controlling power actuators and electronic measurement components in process engineering plants, in which data is transmitted to a control device by means of power line communication as a point-to-point connection.

SUMMARY OF THE INVENTION

One idea of the present disclosure is to provide a heating system and a method for operating a heating system for aircraft or spacecraft in which the cabling required for the sensors can be reduced.

In accordance with one aspect, the present disclosure provides a heating system for an aircraft or spacecraft with a control device which comprises at least one power line data transmission transceiver and one sensor controller, and at least one remote component which comprises a sensor element and a heating element, the at least one power line data transmission transceiver being connected to the at least one remote component by means of a connecting cable, the control device being designed to supply the at least one heating element with power via the connecting cable and the sensor controller being designed to exchange first control signals with the sensor element via the connecting cable.

In accordance with a further aspect, the present disclosure provides a method for operating a heating system for an aircraft or spacecraft, in particular a heating system according to the invention, with the following steps: supplying a first remote component, which comprises a heating element, with power by a control device via a first connecting cable, and exchanging control signals between the control device and a sensor element of the first remote component via the first connecting cable.

In accordance with a further aspect, the present disclosure provides an aircraft or spacecraft which comprises a heating system.

One idea on which the present invention is based is to save on the complex cabling between the control device and the sensor by passing the control signals between the control device and the sensor via a power supply line for the heating elements of the respective remote components. The power line communication, or PLC, technique can be used for this purpose.

A one-to-one power connection is advantageously provided between the control device and the remote components so as to prevent any disturbances or external influences due to other users, thus improving the reliability of the control system.

A further advantage is that installation expenditure, the space required and the overall weight of the aircraft or spacecraft can be considerably reduced by omitting the sensor cabling.

In accordance with an embodiment of the heating system, the sensor controller can be designed to communicate with the sensor element by means of a power line data transmission system. This offers the advantage that the sensor controller can use the power line communication (PLC) technique.

In accordance with a further embodiment of the heating system, the control device may comprise a heating controller which is designed to exchange second control signals with the heating element via the connecting cable. This offers the advantage that control data can not only be exchanged with the sensor element, but also with the heating element via the supply line, for example to adjust the heating output of the heating element by the control device or to query the operating status of the heating element.

According to a further embodiment of the heating system, the sensor element may be a temperature sensor and the first control signals may comprise temperature measurement values in the vicinity of the remote components. Recording the temperature directly at the heating elements is particularly advantageous for temperature recording in order to facilitate optimum control of the heating elements.

According to a further embodiment of the heating system, the remote component may be an evaluation circuit which is designed to evaluate the temperature measurement values recorded by the temperature sensor. This offers the advantage that the recorded sensor data can be evaluated directly in situ in the respective remote components, and need not merely be evaluated centrally in the control device.

In accordance with an embodiment of the method, a second remote component comprising a heating element may also be supplied with power by the control device via a second connecting cable, and control signals may be exchanged between the control device and a sensor element of the second remote component via the second connecting cable. This offers the advantage that each remote component comprises its own connecting cable via which it is supplied with power from the control device, and via which control signals can be exchanged with the respective sensor element. This makes one-to-one data connections possible and communication between the individual remote components and the control device is not disrupted by control signals or power supply to other remote components.

BRIEF DESCRIPTION OF THE DRAWINGS

The invention is explained below in greater detail with the aid of embodiments and with reference to the attached figures in the drawing, in which.

Figure 1:
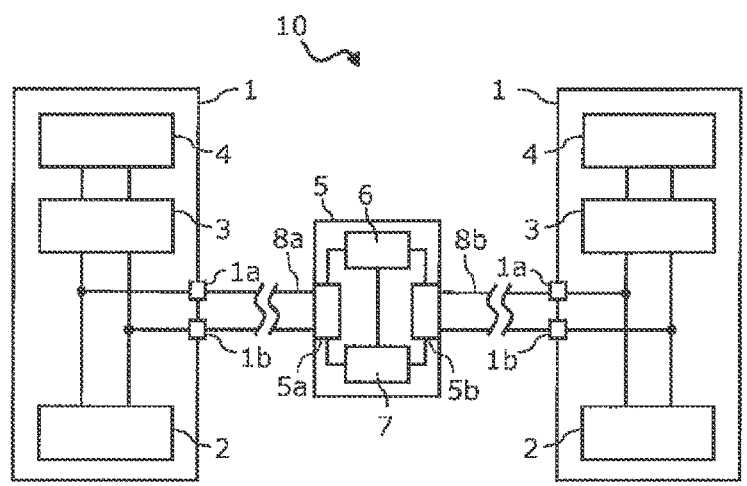
FIG. 1 is a schematic representation of a heating system for an aircraft or spacecraft in accordance with an embodiment of the present invention.

The described embodiments and developments can be combined in any conceivable combination. Further possible embodiments, developments and uses of the invention also include combinations of features of the invention described previously or below with respect to the embodiments, even if not explicitly specified.

The enclosed drawings should convey further understanding of the embodiments of the invention. They illustrate embodiments of the invention and clarify the principles and concepts behind the invention in conjunction with the description. Other embodiments and many of the described advantages are apparent with respect to the drawings. The elements of the drawings are not necessarily illustrated true to scale with respect to each other. Here, the same reference numerals refer to the same components or components with a similar function.

DETAILED DESCRIPTION OF THE PREFERRED EMBODIMENTS

Figure 2:
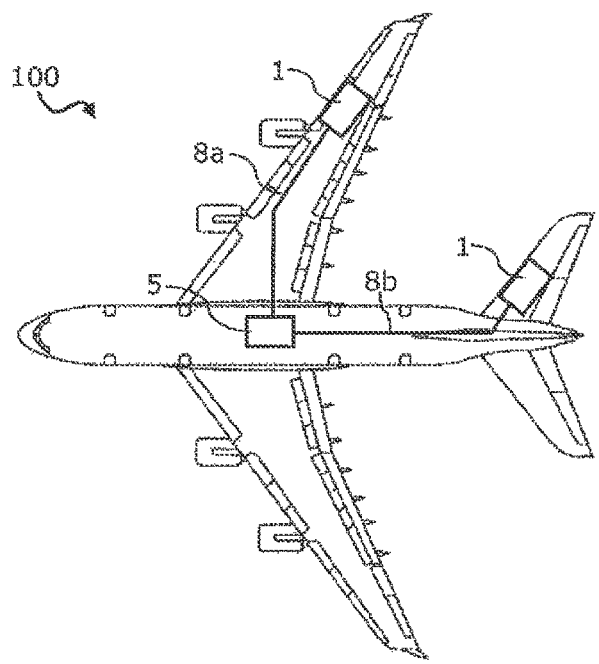
FIG. 2 is a schematic representation of an aircraft or spacecraft with a heating system in accordance with a further embodiment of the present invention.

FIG. 1 is a schematic representation of a heating system 10 for an aircraft or spacecraft in accordance with an embodiment of the present invention. The heating system 10 may, for example, be used in an aircraft or spacecraft 100 as shown schematically in FIG. 2.

The heating system 10 comprises a control device 5 and at least one remote component 1. Remote components 1 as defined in the present invention are components which are positioned at separate locations, physically separated from the control device controlling the components, in order to perform locally restricted functions such as, for example, sensor data acquisition or providing locally restricted heating output.

The control device 5 comprises at least one power line data transmission transceiver 5a, 5b. The control device may also comprise a sensor controller 7. In addition, the control device may comprise a heating controller 6. The sensor controller 6 and the heating controller 7 may each be connected to one or more of the power line data transmission transceivers 5a, 5b. The power line data transmission transceivers 5a, 5b, or PLC transceivers, may be designed to ensure a power line communication function (PLC) via the connecting cables 8a, 8b.

The control device 5 can be connected to a respective remote component 1 via the connecting cables 8a, 8b. The connecting cables 8a, 8b may, for example, be laid along the M route in an aircraft or spacecraft 100 and connected to the respective remote component 1 via cable connections 1a and 1b. In the present example in FIG. 1, two connecting cables 8a and 8b are provided in each case, a first cable connection 1a being connected to a first of two connecting cables 8a or 8b and a second cable connection 1b being connected to a second of two connecting cables 8a or 8b. Each of the remote components 1 comprises a sensor element 4 and a heating element 2. In this case, the control device 5 is designed to supply the heating elements 2 with power via the connecting cable 8a, 8b. In particular, power is supplied in order to guarantee the heating function of the heating elements 2. In this case, the heating function can be controlled or adjusted by the sensor controller 7 as a function of sensor data. The sensor controller 7 may also be designed to exchange first control signals with the sensor element 4 via the connecting cable 8a, 8b. For example, the sensor controller 7 can send control signals to the sensor element 4 or receive sensor data from the sensor element 4. In this case, the sensor controller 7 can be designed to communicate with the sensor element 4 by means of a power line data transmission system. The power line data transmission system may be power line communication (PLC) or PowerLAN.

The control device 5 may also comprise a heating controller 6 which is designed to exchange second control signals with the heating element 2 via the connecting cable 8a, 8b. The second control signals may, for example, be used to query or change the operating status of the heating element 2. The second control signals can also be transmitted or received by the heating controller by means of a power line data transmission system via the connecting cables 8a, 8b.

The sensor element 4 may, for example, be a temperature sensor which records temperature measurement values in the vicinity of the remote component 1. These temperature measurement values may be evaluated in an evaluation circuit 3, for example.

In this case, the remote components 1 may, for example, be pipe heating components, underfloor heating components, drainage heating components or waste water pipe heating components in an aircraft or spacecraft, for example the aircraft or spacecraft 100. The position of the remote components 1 in or on the aircraft or spacecraft 100 is only shown by way of example in FIG. 2, and it is of course possible to position the remote components 1 at any location in the aircraft or spacecraft 100 which is suitable for the field of application. The number of remote components 1 is also only specified as two by way of example, as any other number of remote components 1 is also feasible for the aircraft or spacecraft 100.

Figure 3:
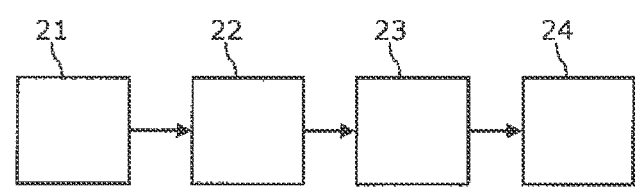
FIG. 3 is a schematic representation of a method for operating a heating system for an aircraft or spacecraft in accordance with a further embodiment of the present invention.

FIG. 3 is a schematic representation of a method 20 for operating a heating system for an aircraft or spacecraft, especially for operating the heating system 10 in FIG. 1. The method 20 may, for example, be used to operate a heating system 10 in an aircraft or spacecraft 100 as shown schematically in FIG. 2.

At 21, a first remote component 1, which comprises a heating element 2, is supplied with power by a control device 5 via a first connecting cable 8a. At 22, control signals are exchanged between the control device 5 and a sensor element 4 of the first remote component 1 via the first connecting cable 8a. The sensor element 4 may, for example, be a temperature sensor which records temperature measurement values in the vicinity of the remote component 1. Temperature measurement values can be exchanged between the control device 5 and a sensor element 4 of the first remote component 1 via the first connecting cable 8a as part of the first control signals.

At 23, optionally a second remote component 1, which comprises a heating element 2, may be supplied with power by the control device 5 via a second connecting cable 8b. In a fourth step 24, control signals may be exchanged between the control device 5 and a sensor element 4 of the second remote component 1 via the second connecting cable 8a. This ensures a one-to-one data exchange via separate connecting cables 8a, 8b of the heating system 10, which makes the method less sensitive to disruptive influences from the power supply or data exchanges of other remote components.

Although the present invention has been described here by means of preferred embodiments, it is by no means limited to these embodiments, but may be modified in many different ways.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A heating system for an aircraft or spacecraft, comprising:
   a control device, which comprises at least one power line data transmission transceiver and a sensor controller; and
   at least one remote component, which comprises a sensor element and a heating element,
   wherein the at least one power line data transmission transceiver is connected to the at least one remote component via a connecting cable,
   wherein the control device is designed to supply the at least one heating element with power via the connecting cable, and
   wherein the sensor controller is designed to exchange first control signals with the sensor element via the connecting cable.

2. The heating system according to claim 1, wherein the sensor controller is designed to communicate with the sensor element by means of a power line data transmission system.

3. The heating system according to claim 1, wherein the control device comprises a heating controller which is designed to exchange second control signals with the heating element via the connecting cable.

4. The heating system according to claim 1, wherein the sensor element is a temperature sensor and wherein the first control signals comprise temperature measurement values in the vicinity of the remote components.

5. The heating system according to claim 4, wherein the remote component comprises an evaluation circuit which is configured to evaluate the temperature measurement values recorded by the temperature sensor.

6. A method for operating a heating system for an aircraft or spacecraft, comprising:
   supplying a first remote component, which comprises a heating element, with power by a control device via a first connecting cable; and
   exchanging control signals between the control device and a sensor element of the first remote component via the first connecting cable.

7. The method according to claim 6, further comprising:
   supplying a second remote component, which comprises a heating element, with power by the control device via a second connecting cable; and
   exchanging control signals between the control device and a sensor element of the second remote component via the second connecting cable.

8. The method according to claim 6, wherein the sensor element comprises a temperature sensor and wherein exchanging control signals entails exchanging temperature measurement values.

9. An aircraft or spacecraft comprising a heating system, the heating system comprising:
   a control device, which comprises at least one power line data transmission transceiver and a sensor controller; and
   at least one remote component, which comprises a sensor element and a heating element,
   wherein the at least one power line data transmission transceiver is connected to the at least one remote component via a connecting cable,
   wherein the control device is designed to supply the at least one heating element with power via the connecting cable, and
   wherein the sensor controller is designed to exchange first control signals with the sensor element via the connecting cable.

10. The aircraft or spacecraft according to claim 9, wherein the at least one remote component is a pipe heating component of the aircraft or spacecraft.

11. The aircraft or spacecraft according to claim 9, wherein the at least one remote component is an underfloor heating component of the aircraft or spacecraft.

12. The aircraft or spacecraft according to claim 9, wherein the at least one remote component is a drainage heating component of the aircraft or spacecraft.

13. The aircraft or spacecraft according to claim 9, wherein the at least one remote component is a waste water pipe heating component of the aircraft or spacecraft.

* * * * *